United States Patent [19]

Bartholomew

[11] Patent Number: 4,897,906
[45] Date of Patent: Feb. 6, 1990

[54] METHOD OF MAKING A FLUID PRESSURE SURGE DAMPER FOR A FLUID SYSTEM

[75] Inventor: Donald D. Bartholomew, Marine City, Mich.

[73] Assignee: Proprietary Technology, Inc., Mt. Clemens, Mich.

[21] Appl. No.: 341,908

[22] Filed: Apr. 24, 1989

Related U.S. Application Data

[62] Division of Ser. No. 115,338, Nov. 2, 1987, Pat. No. 4,823,844.

[51] Int. Cl.$^4$ .................. B21K 21/00; B21D 53/00
[52] U.S. Cl. ................................. 29/890.9; 138/26; 138/30
[58] Field of Search .................. 29/157, 422, 515, 520, 29/521; 138/26, 28, 30, 31; 220/85 B; 137/207, 568, 593

[56] References Cited

U.S. PATENT DOCUMENTS

| | | | |
|---|---|---|---|
| 596,062 | 12/1897 | Firey | 138/28 |
| 2,495,693 | 1/1950 | Byrd, Jr. et al. | 138/26 |
| 2,599,325 | 6/1952 | Fritzberg | 138/28 |
| 2,629,402 | 2/1953 | Cook | 138/28 |
| 2,701,583 | 2/1955 | Rux | 138/26 |
| 3,061,039 | 10/1962 | Peters | 181/42 |
| 3,123,900 | 3/1964 | Millar | 29/157 R |
| 3,376,625 | 4/1968 | McCulloch | 29/157 R |
| 3,430,659 | 3/1969 | Henderson | 138/26 |
| 3,621,882 | 11/1971 | Kupiec | 138/30 |
| 4,448,538 | 5/1984 | Mantel | 181/227 |
| 4,570,745 | 2/1986 | Sparks et al. | 29/157 R |

FOREIGN PATENT DOCUMENTS

| | | | |
|---|---|---|---|
| 1345 | 11/1891 | United Kingdom | 138/28 |
| 581993 | 10/1946 | United Kingdom | 138/28 |

Primary Examiner—P. W. Echols
Assistant Examiner—Irene Cuda
Attorney, Agent, or Firm—Harness, Dickey & Pierce

[57] ABSTRACT

A fluid surge damper for damping fluid pressure surges in a fluid system. The damper including a housing and elastomeric element located therein which is protected from the deleterious effects of the fluid by a flexible membrane. The flexible membrane contains a subatmospheric pressure which draws the flexible membrane against the elastomeric element resulting in a partial compression of the elastomeric element. If the continuity of the flexible membrane is destroyed, the subatmospheric condition will equalize with ambient pressure conditions and the elastomeric element will expand to its original shape thereby providing a readily visual indication of a faulty unit. In addition, the flexible membrane may be sealed while containing a partial volume of liquid and the elastomeric material used may be liquid permeable, therein acting in combination to limit the physical deformation of the elastomeric material by defining a minimum volume to which the elastomeric material may be compressed. This feature provides a fluid surge damper which will not be damaged by fluid surges which might otherwise deform the elastomeric material beyond its elastic limit.

3 Claims, 1 Drawing Sheet

METHOD OF MAKING A FLUID PRESSURE SURGE DAMPER FOR A FLUID SYSTEM

This is a division of U.S. patent application Ser. No. 115,338, filed Nov. 2, 1987, entitled "Fluid Pressure Surge Damper for a Fluid System", now U.S. Pat. No. 4,823,844.

BACKGROUND AND SUMMARY OF THE INVENTION

The present invention is generally related to an improvement in fluid systems and particularly to an apparatus which may be used to minimize damage to the components of fluid systems due to the effect of fluid pressure surges The design of many fluid systems is complicated by the necessity to provide protection from damage due to fluid pressure surges. Fluid pressure surges occur whenever a fluid which is flowing through a system experiences a sudden change in flow rate, pressure, or direction. Such sudden changes can blow out seals, jam closely fitted parts, impair operating efficiencies, create undesirable noises, and damage system components such as pressure gauges, flow meters, and the like.

Various techniques have been used to reduce or eliminate fluid surges within a fluid system. One such technique is to utilize elastomeric elements in contact with the fluid of a fluid system. The fluid pressure surges within such a fluid system deform the elastomeric elements to effect damping of the fluid pressure surges. The disadvantage of this technique is that many elastomeric materials may be adversely affected by the associated fluid, resulting in premature failure of the damping device. Placing the elastomeric element in a surrounding membrane has been suggested, but this raises the potential problem of the membrane having an undisclosed manufacturing flaw. Detection of such a flaw is extremely difficult, and when there is no means for diagnosing such a flaw, the flaw may not be discovered. Upon installation of such a flawed elastomeric element in a fluid system, the elastomeric material will be exposed to the deleterious effects of the fluid possibly resulting in a breakdown of the elastomeric material. Such a breakdown of the elastomeric material may cause contamination of the fluid and possible destruction of the fluid system components.

Another disadvantage is that the elastomeric elements may be stressed beyond the range of elasticity for such a material upon exposure to extreme fluid pressure surges. Such deformation can rapidly decrease the elastic properties of the elastomeric members reducing their ability to dampen fluid pressure surges.

In view of the foregoing, it is an object of the present invention to provide a fluid pressure surge damper having an elastomeric member encased within a flexible membrane which provides a readily discernible self-diagnostic indication of the continuity of the flexible membrane.

Another object of the present invention is to provide a fluid pressure surge damper having an elastomeric member with a maximum deformation limit.

A further object of the present invention is to provide a fluid pressure surge damper for fluid systems which is of simple construction, easy to install, requires a minimum of maintenance, is inexpensive to manufacture, has a minimum number of parts, and is efficient in operation.

In particular the presently described invention includes a fluid pressure surge damper for damping pressure surges of fluid in a fluid system. The damper comprises a housing which contains an elastomeric element which has a flexible membrane means. The flexible membrane means provides an impervious barrier between the elastomeric element and the fluid. The housing has a connector means for connecting the housing to the fluid system. The elastomeric element is retained within the housing in a predetermined position by a means which prevents the elastomeric element from impeding the flow of the fluid. The elastomeric element has an outer peripheral portion which is compressed by the flexible membrane means in response to forces imposed thereof by a pressure differential across the membrane. The pressure differential is preferably due to a subatmospheric pressure contained within the membrane.

The presently described invention includes an embodiment wherein the flexible membrane means contains a partial volume of liquid and a liquid permeable elastomeric element. Upon ultimate compression, the partial volume of liquid defines a minimum volume to which the elastomeric element will be deformed. Providing such a limit prevents damaging deformation of the elastomeric element.

Additional objects and advantages of the present invention will become apparent from a reading of the detailed description of the preferred embodiment which makes reference to the following set of drawings.

DETAILED DESCRIPTION OF THE INVENTION

Figure 1:
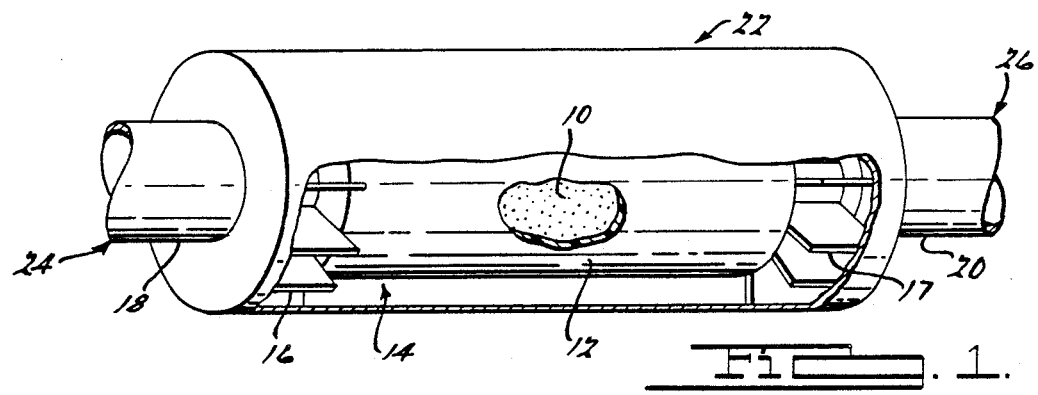
FIG. 1 is a perspective view with partial cutaway of the fluid pressure surge damper installed in a flow-through type housing.

Referring to FIG. 1, a fluid pressure surge damper for a fluid system constructed in accordance with an exemplary embodiment of the present invention, is shown as comprising an elastomeric element 10, surrounded by a flexible membrane 12' which is located by a pair of retainers 16 and 17 at inlet portion 18 and outlet portion 20 respectively, of inline housing 22. HOUSING 22 may be connected to a fluid system by connections 24 and 26. The connections 24 and 26 may be any form of tubing or pipe connection including, but not limited to, mating flanges, threaded couplings, and solder joints. To compensate for the fluid flow impeded by the presence of the elastomeric element assembly 14, the central portion of housing 22 has a generally enlarged cross section in relation to that of the inlet portion 18 and outlet portion 20.

Figure 2:
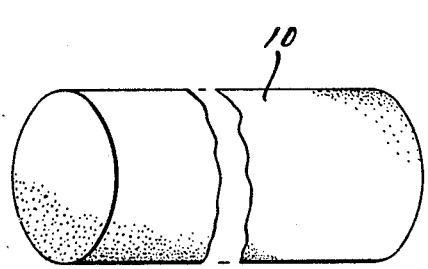
FIG. 2 is a perspective view of the elastomeric element.

FIG. 2 discloses a generally cylindrically shaped elastomeric element 10 for use in an exemplary embodiment of the present invention. The elastomeric element 10 may be constructed from any elastomeric material capable of elastic deformation within a portion, or all, of the pressure spectrum imposed by the associated fluid system. The elastomeric material is preferably an open or closed cell synthetic foam. The elastomeric element may be of any shape or size as suited to the particular fluid system and the magnitude and frequency of the fluid pressure surges which may be expected.

Figure 3:
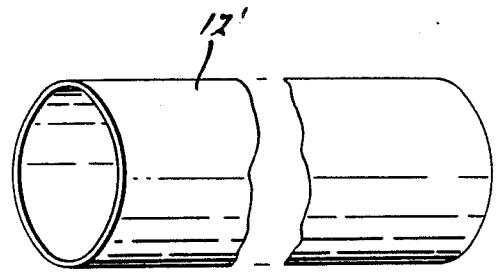
FIG. 3 is a perspective view of an unsealed flexible membrane.

FIG. 3 discloses an unsealed flexible membrane 12' used to surround the elastomeric element 10. The unsealed flexible membrane 12' is preferably constructed from a synthetic film such as, for example, polyethylene or an equivalent polymeric material which is impervious to the deleterious effects of the fluid contained within the fluid system. The deleterious effects may include, but are not limited to, mechanical abrasion, chemical reaction, and thermal shock.

Figure 4:
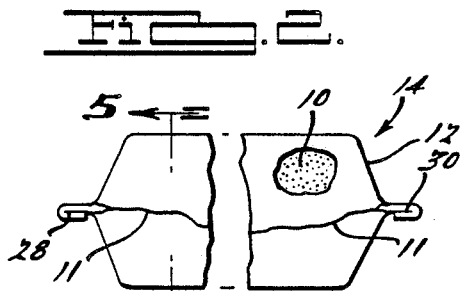
FIG. 4 is a side view with partial cutaway of the elastomeric element assembly.
Figure 5A:
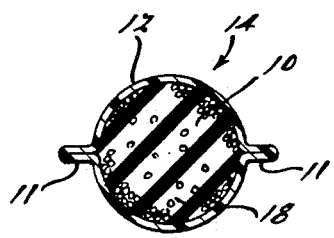
FIG. 5A is a cross-sectional view taken along the lines 5—5 of FIG. 4 showing the elastomeric element surrounded by a subatmospheric pressure and contained within a flexible membrane.
Figure 5B:
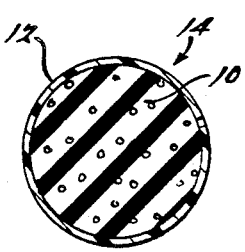
FIG. 5B is a cross-sectional view taken along lines 5—5 of FIG. 4 showing the elastomeric material and the flexible membrane at equalized pressure.

FIG. 4 discloses an elastomeric element assembly 14 comprising an elastomeric element 10 surrounded and sealed within a flexible membrane 12' in accordance with the principles of the present invention. The elastomeric element assembly 14 is completed by installing the elastomeric element 10 within an unsealed flexible membrane 12', compressing the entire unit and thereby selectively deforming the unsealed flexible membrane 12' and the elastomeric element 10, and then sealing both ends 28 and 30 of the flexible membrane 12'. The flexible membrane 12' may be sealed by any method, such as by use of heat, solvent, or adhesive. Subsequent to sealing the flexible membrane 12', the compression of the elastomeric element 10 may be released. The volume of air contained within the elastomeric element assembly 14 upon expansion of the elastomeric element 10 will be less than that present in an equivalent volume at the atmospheric conditions which existed at the time of assembly. The result is a subatmospheric pressure condition within the flexible membrane 12'. The subatmospheric pressure condition within the flexible membrane 12' draws the flexible membrane 12' against the elastomeric element 10 partially compressing the elastomeric element portion 18 of the elastomeric element assembly 14. (as shown in FIG. 5A.) The subatmospheric pressure contained within the flexible membrane 12' provides a sufficient pressure differential across the flexible membrane 12' to draw or force the flexible membrane 12' against the elastomeric element 10 despite variations in barometric pressure which may occur due to weather and/or partial elevation. To assure consistency in production of the elastomeric element assembly 14, the compression and sealing process may be performed in a controlled pressure environment. The flexible membrane portion 11 (as seen in FIG. 5A) taking the form of a wrinkle, illustrates the fact that the natural circumferential dimension of the flexible membrane 12' is defined by the circumferential dimension of the elastomeric element 10 in an uncompressed condition. (as shown in FIG. 5B.) FIG. 5B illustrates an elastomeric element assembly 14 having equalized pressure across the flexible membrane 12'. Such a condition will exist prior to compression and sealing of the elastomeric element assembly 14, as well as if the continuity of the flexible membrane 12' is destroyed subsequent to assembly. Upon destruction of the subatmospheric condition contained within the elastomeric element assembly 14, the flexible membrane 12' will relax the forces previously exerted against the elastomeric element 10, resulting in the elastomeric element 10 returning to its original uncompressed shape. The comparatively enlarged diameter of the elastomeric element assembly 14, shown in FIG. 5B, in relation to the elastomeric element assembly 14, shown in FIG. 5A, serves as an indication of a faulty flexible membrane 12'. Such an indication will prompt the individual servicing the apparatus of the present invention to dispose of the faulty unit. Without such a self-diagnostic indicator, the faulty assembly would go undetected, and upon installation within a fluid system, the elastomeric material would be exposed to the deleterious effects of the fluid. Such exposure may result in deterioration of the elastomeric material and possible contamination and complete destruction of the fluid system.

Figure 6A:
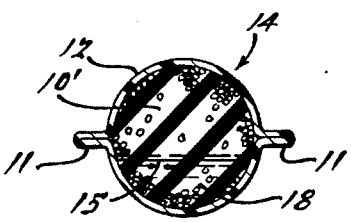
FIG. 6A is a cross-sectional view taken along lines 5—5 of FIG. 4 showing a liquid permeable elastomeric element surrounded by atmospheric pressure and contained within a flexible membrane partially filled with liquid.
Figure 6B:
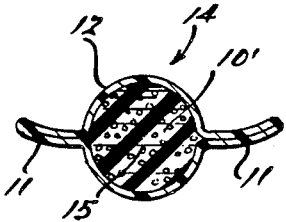
FIG. 6B is a cross-sectional view taken along lines 5—5 of FIG. 4 showing a liquid permeable elastomeric element contained within a flexible membrane which is partially filled with liquid and wherein the entire assembly is compressed to a minimum volume.

The volume that the elastomeric element assembly 14 will displace upon ultimate compression may be controlled by using a liquid permeable elastomeric element 10' and adding a partial volume of liquid 15 to the elastomeric element assembly 14 (as shown in FIG. 6A and 6B). The volume of liquid used should be selected such that it defines a minimum volume to which the elastomeric element may be deformed (as shown in FIG. 6B) and that volume defines a dimension which is within the range of elastic deformation for the elastomeric element. Establishing such a minimum volume to which the elastomeric element 10' may be compressed assures that the elastomeric element 10' will not be stressed beyond its elastic limit. Providing a limitation on the amount of deformation the elastomeric element 10' will experience, increases the life of the elastomeric element and assures maximum effectiveness throughout that life. The liquid used may be any liquid which is compatible with the elastomeric material and which will permeate the elastomeric material with a minimum of resistance. The liquid used is preferably water. The flexible membrane portion 11, as seen in FIG. 6A and 6B, taking the form of a wrinkle, illustrates the fact that the natural circumferential dimension of the flexible membrane 12' is defined by the precompressed circumferential dimension of the elastomeric element 10 as shown in FIG. 5B.

Figure 7:
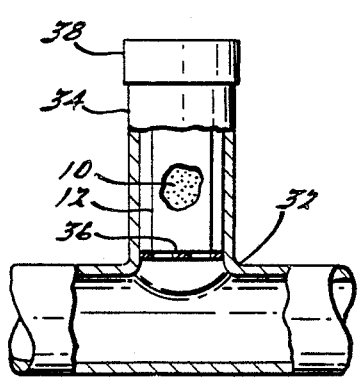
FIG. 7 is a cross-sectional view of the fluid surge damper installed in a T-section of a fluid system.

FIG. 7 shows a further embodiment of the flexible membrane assembly 14 installed in a T-section 32 of a fluid system. In FIG. 7, the housing 34 extends perpendicular to the flow of the fluid. It is important to note that the direction of extension is not critical to the function of the present invention and that any direction may be utilized as long as communication between the elastomeric element assembly 14 and the fluid of the fluid system is maintained. The housing has an elastomeric element assembly retaining member 36, which retains the elastomeric element assembly 14 within the housing 34. The retainer 36 may be any device which allows fluid to readily pass therethrough while maintaining the elastomeric element assembly 14 in a fixed position within the housing 34. The retaining member 36 may comprise a wire mesh or wire screen material. The housing 34 preferably has a removable end cap 38 which permits inspection and/or replacement of the elastomeric element assembly 14 as may be necessary.

Figure 8:
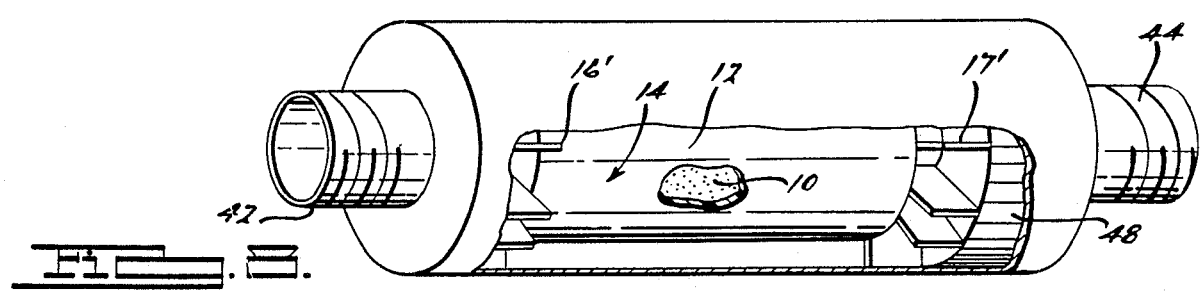
FIG. 8 is a perspective view with partial cutaway of a fluid surge damper with a filtration media installed in a flow-through type housing.

FIG. 8 shows another embodiment of the fluid pressure surge damper in a perspective view with portions cut away revealing the elastomeric element assembly 14 installed within housing 40. The housing 40 has a pair of male threads 42 and 44 disposed upon the inlet 18' and outlet 20'. To compensate for the fluid flow impeded and to adapt the housing 45 to receive a filtration media 48, the cross-sectional area of the central portion of housing 40 must be generally enlarged with respect to the inlet portion 18' and outlet portion 20'. The housing 40 also has a retainer 16' and 17' located at opposing ends thereof to prevent the elastomeric element assembly 24 from moving about within the housing 40 and possibly blocking the inlet 18' and the outlet 20'.

The examples provided herein of housing structure and the relative arrangement within the fluid system are for purposes of illustration only. The housing and the elastomeric element used may have any shape or size as required by the magnitude and frequency of fluid surges anticipated. It is preferable that fluid pressure surge dampers as disclosed herein be located near sources of the fluid pressure surges so that the fluid surges may be readily absorbed before being communicated over any distance and/or exposed to many components of the fluid system. In addition, multiple fluid pressure surge damping units may be located about the system at sources of fluid pressure surges or at the immediate location of components particularly sensitive to fluid surges.

In this fashion, an effective fluid surge damper is provided that can be incorporated in many standard fluid systems. Many variations in shape, size, and in the materials which may be used are within the spirit of this invention disclosed in the above specification. Accordingly, it is understood that the scope of the present invention is not to be limited by the specific illustrated examples shown and described herein but rather by the scope of the appended claims.

I claim:

1. A method for forming a dampener comprising the steps of;
    (1) inserting an elastomeric element within an unsealed flexible membrane means,
    (2) compressing said elastomeric element and said unsealed flexible membrane,
    (3) sealing said unsealed flexible membrane means, and
    (4) releasing said compressed elastomeric element thereby producing a subatmospheric condition within said flexible membrane means.

2. A method for forming a dampener as in claim 1 further comprising the step of adding a partial volume of liquid to said flexible membrane means prior to sealing said flexible membrane means and wherein said elastomeric element is liquid permeable.

3. A method for forming a dampener comprising the steps of;
    (1) inserting a liquid permeable elastomeric element within an unsealed flexible membrane means,
    (2) adding a partial volume of liquid to said elastomeric element contained within said unsealed flexible membrane means, and
    (3) sealing said unsealed flexible membrane means such that a subatmospheric pressure is formed around said permeable elastomeric element within said seal membrane means.

* * * * *